US008714422B2

(12) United States Patent
Yu

(10) Patent No.: US 8,714,422 B2
(45) Date of Patent: May 6, 2014

(54) WRIST-BASED SYSTEMS AND METHODS TO CARRY MOBILE DEVICE(S)

(76) Inventor: David Chen Yu, Laguna Niguel, CA (US)

( * ) Notice: Subject to any disclaimer, the term of this patent is extended or adjusted under 35 U.S.C. 154(b) by 160 days.

(21) Appl. No.: 13/422,104

(22) Filed: Mar. 16, 2012

(65) Prior Publication Data

US 2013/0240579 A1   Sep. 19, 2013

(51) Int. Cl.
*A45F 3/14*   (2006.01)
*A45F 5/00*   (2006.01)

(52) U.S. Cl.
USPC ........... 224/219; 224/217; 224/218; 224/267; 224/197; 224/930; 24/3.2; 294/25; 401/8; D3/218

(58) Field of Classification Search
USPC ......... 224/217–219, 267, 930, 197, 222, 255, 224/162; 24/3.2; 294/25; 401/8; D3/218
See application file for complete search history.

(56) References Cited

U.S. PATENT DOCUMENTS

| | | | |
|---|---|---|---|
| D518,950 S * | 4/2006 | Condiff | D3/218 |
| 2004/0069823 A1* | 4/2004 | Condiff | 224/269 |
| 2004/0069824 A1* | 4/2004 | Condiff | 224/269 |
| 2005/0205622 A1* | 9/2005 | Liu | 224/217 |
| 2007/0181620 A1* | 8/2007 | Carver, III | 224/217 |
| 2007/0278265 A1* | 12/2007 | Contente | 224/162 |
| 2012/0080462 A1* | 4/2012 | Hajarian | 224/219 |

FOREIGN PATENT DOCUMENTS

| | | | | | |
|---|---|---|---|---|---|
| GB | 2407023 A | * | 4/2005 | | A45C 1/04 |
| JP | 2007243893 A | * | 9/2007 | | |
| WO | WO 2008130089 A1 | * | 10/2008 | | H04B 1/38 |

* cited by examiner

*Primary Examiner* — Justin Larson
*Assistant Examiner* — Scott McNurlen

(57) ABSTRACT

Systems and methods are disclosed to conveniently carry a mobile device, among others, on a wrist brace. The systems include a case to enclose the mobile device and a system to wear the apparatus on a wrist. The system is comprised of the case; a case tether coupled to the case; a wristband tether coupled to a wrist brace; a finger ring to loop around a finger and a case lock to secure the case in a closed position. Also presented, a method to carry and use the device while tethered to a wrist.

13 Claims, 3 Drawing Sheets

WRIST-BASED SYSTEMS AND METHODS TO CARRY MOBILE DEVICE(S)

BACKGROUND

The present invention pertains to wrist-based systems and methods to carry mobile device(s).

Personal electronic devices have become extremely popular, providing on-the-go entertainment and data access as well as mobile phone service. Other personal electronic devices such as music players and video players have also gained in use and popularity.

Personal electronic devices are often carried in a pocket or purse, or may be attached to a holster attached to a belt. While some cases may offer protection alone, this protection often fails to provide quick access, ease of use and may take up room in a pocket or handbag.

SUMMARY

Systems and methods are disclosed to conveniently carry a mobile device, among others, on a wrist brace. The system includes a case to secure the mobile device; a case having a hook adapted to receive a case tether in the form of a strap or ring to secure a finger ring and a case lock, a wrist brace tether coupled to a wrist brace and the method to carry the case on the wrist and the case can be locked and move into a stowed position on the underside of a user's wrist.

Implementations of this aspect may include one or more of the following. The flexibility of the case tether coupled to the case allows the mobile device to move to a landscape position, a vertical position or facing to or facing away from the user. A wrist brace can be worn on a wrist and slidably connected to the wristband tether. During use, the mobile device is inserted into the case. Next, a user slips his/her finger into the finger ring. The user then wears the wrist brace and secures the case to the wrist of the user.

The use of the tether-housing offers further mobility. The case can be detached from the tether and can be carried around on its own without attaching to the palm.

The above embodiment supports carrying the mobile device while allowing the hand wearing the wrist brace to perform other tasks. This method of carrying devices on the wrist minimizes the chance of an accidental dropping of the device and misplacing the device. While working with water or liquid it minimizes the chance of liquid being spilled onto and damage the device. If the case were mingled with other personal accessories in the purse or pocket, scratching the surface of the case is a real possibility but would be avoided with the using of the present system.

The carrying devices described above provides for an efficient and convenient apparatus for carrying, using, and protecting a personal electronic device that can be attached to a user's wrist.

DETAILED DESCRIPTION

Figure 1:
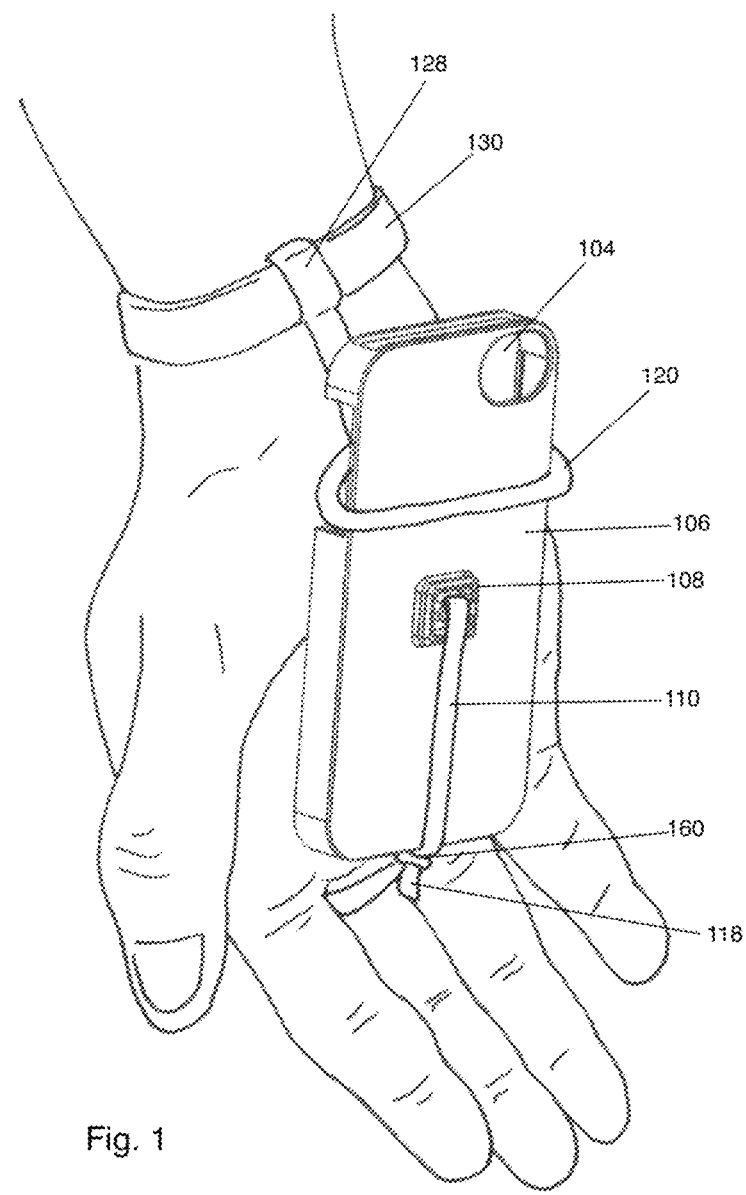
FIG. 1 shows an exemplary apparatus in a closed position to carry a mobile device attached to a user's wrist.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the preferred embodiment will be described in detail by way of example with reference to the attached drawings. Throughout this description, the preferred embodiment and examples shown should be considered as exemplars, rather than as limitations on the preferred embodiment and any equivalents thereto. Furthermore, reference to various feature(s) of the preferred embodiment throughout this document does not mean that all claimed embodiments or methods must include the referenced feature(s).

FIG. 1 shows an exemplary apparatus in a closed position to carry a mobile device attached to a user's wrist. The case 106 is secured to a user's wrist with several components. Case 106 is a case, designed to protect a phone or a mobile device. The case 106 contains a hole 104 to accommodate for a camera built-in to the mobile device.

Case tether 110 with a locked case lock 120 secures the case 106 to the wristband tether 128. The case lock 120 comprises of a flexible ring but it can also be any other closure configurations capable of locking and securing the case to the tether. A case lock coupling 168 [see FIG. 3] located in the wristband tether 128 adaptably secures the case lock 120 to the wristband tether 128. To secure the case 106 in its closed position, case lock 120 is looped, buttoned or buckled around the body of the case 106. To unlock the case 106 into its opened position, a user simply unloop, unbutton or unbuckle the case lock 120 from the case 106.

A tether-housing 108 on the case 106 securely coupled it to a case tether 110. The tether-housing 108 is comprised of a hook 172 [see FIG. 3] surrounded by a retaining wall. The purpose of the retaining wall is to prevent the case tether 110 from being unhooked accidentally.

Figure 3:
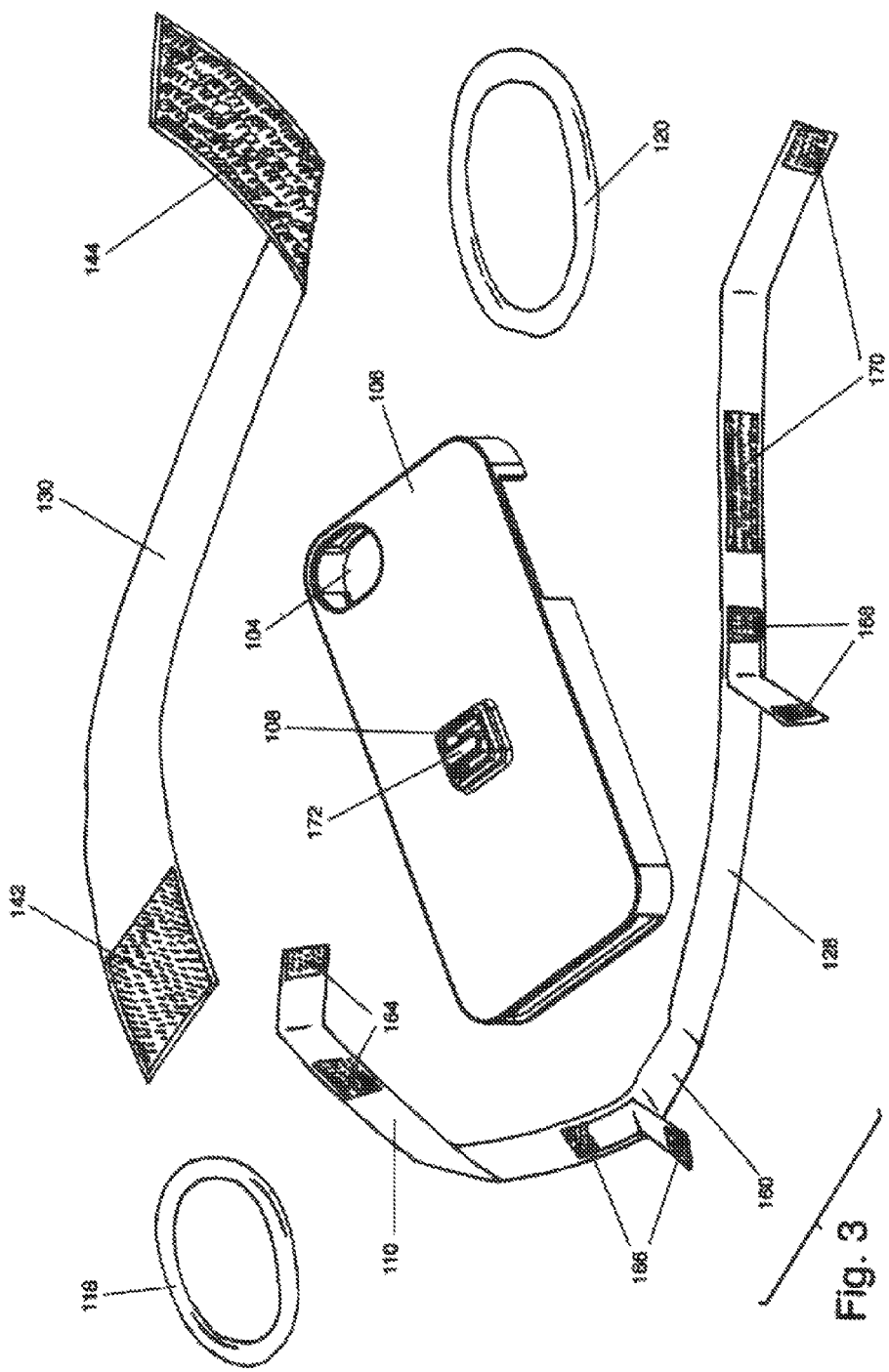
FIG. 3 shows an exemplary apparatus that comprises of a case detached from its tether, along with the tether, wristband tether and wrist strap.

The case tether 110 can be a strap or a ring with the opening large enough to slide into the hook 172 [FIG. 3] of the tether-housing 108. Case tether 110 can be bent and twisted into any desired positions by a user. In the carrying mode, the case tether 110 is hooked to the tether-housing 108 and securely attaches the mobile device to the wrist brace 130. Case tether 110 can be detached from tether-housing 108 as desired by the user. To unhook from the tether-housing 108, user can simply slide the case tether 110 out from the hook 172 in the tether-housing 108. While unhooked, the case 106 can be carried and used separately by a user. The other end of the case tether 110 is the head of tether 160. The head of tether 160 is coupled to a coupling 166 [FIG. 3] that holds a finger ring 118 and joints the case tether 110 and wristband tether 128 together. The coupling 166 for the finger ring 118 locks the finger ring 118 in place. The jointing of the case tether 110 and wristband tether 128 creates a continuous strap that secures the case 106 to the wrist brace 130. A finger ring 118 holds the case 106 to a user's finger.

On the other end, a wristband tether 128 and a wrist brace 130 secures the case 106 to a user's wrist. The wristband tether 128 is looped and locked in around the wrist brace 130. To adjust the length of the wristband tether 128, a user can loop the end 170 of the wristband tether 128 up or down the end and attach its hooks to the appropriate loops or snap button the end of the wristband tether 128 to its proper receptacle. The wrist brace 130 can include a wristband and a strap slidably coupled to the wristband. The wristband tether 128 is pivotably and rotatably coupled to the wrist brace 130.

Figure 2:
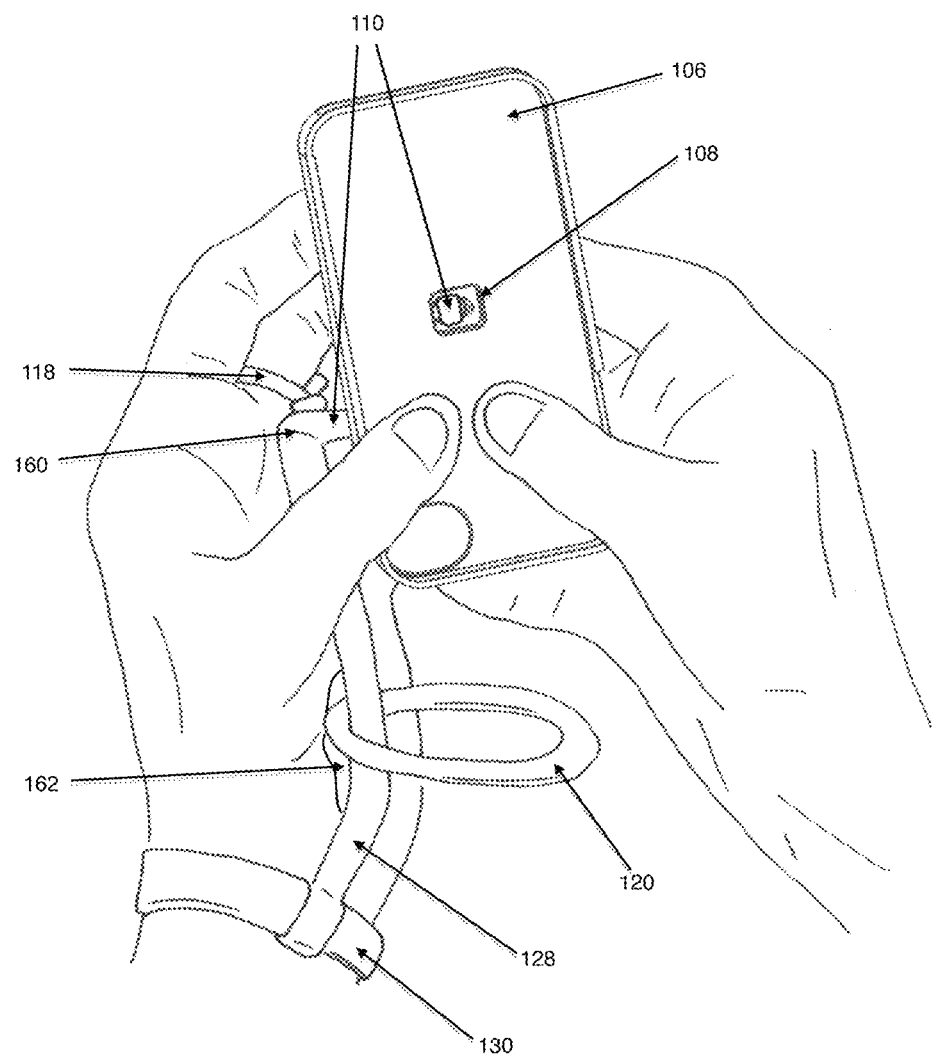
FIG. 2 shows an exemplary apparatus in an unlocked position and in use by a user.

FIG. 2 shows an exemplary apparatus in an unlocked position and in use by a user. In FIG. 2, the user is typing on the mobile device or phone (not shown) with the user's fingers. The case 106 is allowed to move unrestrained by the case tether 110.

The case lock 120 releases the case 106 into the opened position and allows for free movement of the case 106 and the mobile device. Head of tether 160 confines the case 106 while it is in its face down position. The wristband tether 128 is secured to the wrist brace 130. The finger ring 118 and wrist brace 130 work together to keep the case 106 in place. The case 106 can also be hanging from the wrist using the wrist brace 130 without looping the finger ring 118 around a finger [not shown]. In this carrying mode, the palm of the hand is free of the case and is available to carry or perform other tasks. As the figures demonstrate, the apparatus allows for a great range of movement of the mobile device.

FIG. 3 shows an exemplary apparatus that comprises of a case detached from its tether, along with the tether, wristband tether and wrist brace. The case 106 is not connected to the case tether 110.

FIG. 3 depicts the case 106 having the tether-housing 108 with its hook 172 in its center surrounded by a retaining wall. In this depiction, the space beneath the hook is hollowed out to reduce the height requirement of the tether-housing 108. This hollowed out is optional. This image also shows the finger ring 118. The wrist brace 130 is secured to the case 106 by the wristband tether 128. Wrist brace 130 would be strapped around a user's wrist and is secured by two straps of Velcro: one with microscopic hooks 142 and another strip with microscopic loops 144 as illustrated. The wristband tether 128 forms a loop around the wrist brace 130 and the loop can slide along the wrist brace 130. The wrist brace 130 wraps around the user's wrist as shown in FIG. 1 and FIG. 2.

Finger ring 118, tethers 110, 128 and wrist brace 130 may be fabricated from any suitable material or a combination of leather, fabric, plastic, webbing, a string, a ring, a strap, cloth or rubber band or synthetic materials.

The mechanism of the closures 120, 142, 144, 164, 166, 168 and 170 in one embodiment is comprised of a strap loop, a band with Velcro type of loops on one side and hooks on another, a belt and buckle, a button and buttonhole or a snap button and receptacle type of configurations. In another embodiment, the coupling is comprised of threaded loop and stitching/gluing and clips. Other embodiments may be by a variety of means to accomplish the task of coupling. The wrist brace 130 is pivotably and rotatably coupled to one end of the case.

In order to provide the best viewing and typing angles, the system flexibly allows the case to face and pivot in omni-directions.

To offer further mobility and with the use of the tether-housing, the case can be detached from the case tether. The case can then be carried around on its own without attaching to the palm. The above embodiment supports carrying the mobile device with or without coupling with a finger ring while allows the hand wearing the case attached to a wrist to perform other tasks. During use, the mobile device is inserted into the case housing which is secured to the base. Next, a user slips his/her finger into the finger ring that secures the base to the finger. The user then wears the wrist brace and secures it to the wrist of the user.

The apparatus described above provides for an efficient and a convenient apparatus for carrying, using, and protecting a personal mobile device such as a cell phone or a camera attached to a user's wrist. These features allow the user to type, take pictures, and complete other activities with ease.

While various embodiments have been described above, it should be understood that they have been presented by way of example only, and not of limitations. Likewise, the various diagrams may depict an example of the preferred embodiment, which is done to aid in understanding the features and functionality that may be included in the embodiment. The present system is not restricted to the illustrated example designs or configurations, but the desired features may be implemented using a variety of alternative designs and configurations. Indeed, it will be apparent to one of skill in the art how alternative functional, logical or physical partitioning and configurations may be implemented to implement the desired features of the present apparatus. Additionally, with regard to flow diagrams, operational descriptions and method claims, the order in which the steps are presented herein shall not mandate that various embodiments be implemented to perform the recited functionality in the same order unless the context dictates otherwise.

Although the above system is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments, whether or not such embodiments are described and whether or not such features are presented as being a part of a described embodiment. Thus the breadth and scope of the present system should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The foregoing description of various disclosed embodiments is provided to enable any person skilled in the art to make or use the present invention. The description is not intended to be limited to the embodiments shown herein but is to be accorded the widest scope consistent with the principles and novel features disclosed herein.

Various modifications and alterations of the above apparatus will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

What is claimed is:

1. An apparatus to carry a mobile device, comprising:
   a case to enclose the mobile device having a tether-housing;
   a finger ring sized to be wearable on a finger;
   a case lock comprising of a flexible loop or a belt with a locking mechanism to keep the case in a closed position;
   a wrist brace slidably coupled to a wrist;
   a wristband tether slidably coupled to the wrist brace, comprising of a flexible strap with a coupling for the case lock; and
   a case tether or ring comprising of a flexible strap or ring with a coupling for the finger ring securely mated to the wristband tether on one end and the other adaptably couple to the tether-housing on the case.

2. The apparatus of claim 1, wherein the tether-housing has a hook or a bar in its center surrounded by a retaining wall.

3. The apparatus of claim 1, wherein the flexible case tether or ring has the coupling for the finger ring at a juncture with the wristband tether.

4. The apparatus of claim 1, wherein the wrist brace is secured to the case by the wristband tether.

5. The apparatus of claim 4, wherein the wrist brace is strapped around a user's wrist and is secured by two straps having one of microscopic hooks and microscopic loops; a belt and a buckle; a button and a buttonhole; and a snap button and a receptacle.

6. The apparatus of claim 1, wherein the wristband tether forms a loop around the wrist brace and the loop slides along the wrist brace.

7. The apparatus of claim 1, wherein the finger ring holds the apparatus to a user's finger.

8. The apparatus of claim 1, wherein the finger ring, the tethers and wrist brace are fabricated using at least one of leather, metal, webbing, strap, string, fabric, plastic, cloth, rubber and synthetic materials.

9. A method of carrying a mobile device or cell phone using an apparatus, comprising: inserting the mobile device into a case, wherein the case having a tether-housing adaptably coupled to a case tether; the case tether is mated to a wristband tether slidably coupled to a wrist brace, the tethers are comprising of flexible straps with couplings for a finger ring and a case lock; the finger ring sized to be wearable on a finger; the case lock comprising of a flexible loop or lockable belt to keep the case in a closed position; and the wrist brace slidably coupled to a wrist; and attaching and securing the apparatus to the wrist.

10. The method of claim 9, comprising securing the apparatus to a finger.

11. The method of claim 9, comprising rotating the mobile device carried in the apparatus to view and face the images omni-directionally to a user.

12. The method of claim 9, comprising flexibly extending the case from a palm of a hand to a comfortable viewing position.

13. The method of claim 9, wherein the apparatus can be coupled to and carried by either a left or right wrist.

* * * * *